March 23, 1926.   D. BAUGHMAN   1,577,676
SIGNALING APPARATUS FOR MOTOR VEHICLES
Filed Jan. 20, 1925
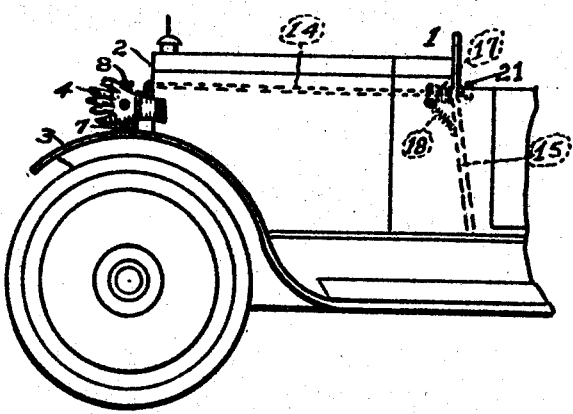
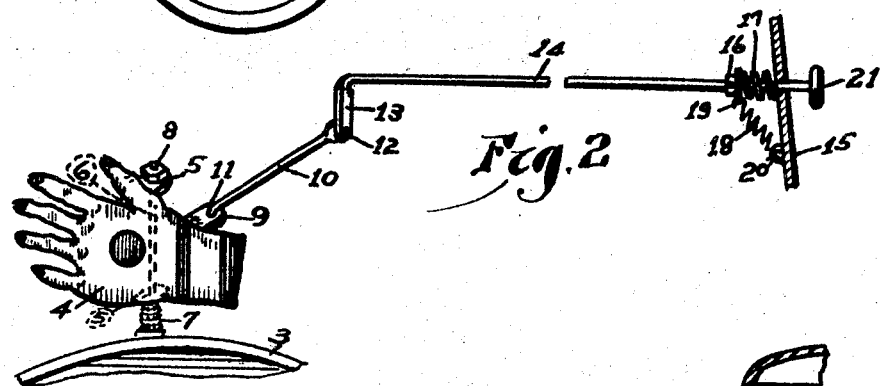
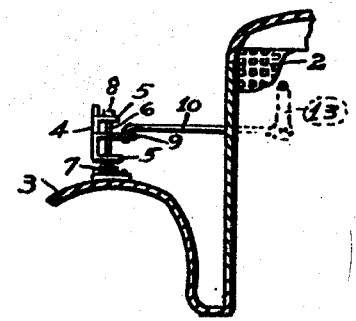
INVENTOR
David Baughman
By Jack Snyder
Attorney Patented Mar. 23, 1926.

1,577,676

UNITED STATES PATENT OFFICE.

DAVID BAUGHMAN, OF PITTSBURGH, PENNSYLVANIA.

SIGNALING APPARATUS FOR MOTOR VEHICLES.

Application filed January 20, 1925. Serial No. 3,682.

*To all whom it may concern:*

Be it known that I, DAVID BAUGHMAN, a citizen of the United States, residing at Pittsburgh, in the county of Allegheny and State of Pennsylvania, have invented certain new and useful Improvements in Signaling Apparatus for Motor Vehicles, of which the following is a specification.

My invention relates to signaling apparatus for motor vehicles, and the primary object thereof is to provide a device of the character described, whereby the driver of an automobile can signal to approaching, following and passing vehicles his intended movements, thereby avoiding confusion and minimizing accident hazards ordinarily concomitant with the operation of speeding motor vehicles.

Further objects of this invention are to provide a signaling apparatus of the class stated, in a manner as hereinafter set forth, which is simple in its construction and arrangement, strong, durable and efficient in its use, compact and readily installed to an automobile of any construction, conveniently operable, positive in its action, attractive in appearance and which is comparatively inexpensive to manufacture and install.

To the accomplishment of these and such other objects as may hereinafter appear, the invention consists of the novel construction, combination and arrangement of parts herein specifically described and illustrated in the accompanying drawing wherein is shown an embodiment of the invention, but it is to be understood that the device shown is merely illustrative and that various changes in the form, proportion, and minor details of construction may be resorted to without departing from the principle or sacrificing any of the advantages of the invention which come within the scope of the claim hereunto appended.

In the drawing forming a portion of this specification and wherein like numerals of reference designate corresponding parts throughout the several views:—

Figure 1 is a fragmentary side view of a motor vehicle provided with a signaling apparatus in accordance with my invention.

Figure 2 is a perspective view of the device.

Figure 3 is a rear end view thereof illustrating its connection with the motor vehicle.

Referring in detail to the drawing 1 denotes a motor vehicle including the radiator 2 and the front left side fender 3.

The signal member 4 is mounted vertically edgewise on the top of the fender 3 and consists of a flat metal plate formed to represent a hand. The signal member 4 is provided with a pair of laterally disposed apertured lugs 5 extending parallel with respect to each other on respective side edges of the signal member 4.

The signal member 4 is pivotally mounted on the vertically disposed supporting pin 6, which latter has its lower end fixed to the fender 4 and extends through the apertured pair of lugs 5. A spiral spring 7 is mounted on the supporting pin 6 intermediate of the lower lug and the fender 3, whereby the signal member 4 is tensionally cushioned to prevent rattling of the signal member 4 during the travel of the vehicle. The signal member 4 is maintained in the properly tensioned position on the supporting pin 6 by the nut 8 which engages the upper threaded end of the latter.

The upper edge of the signal member 4 is further formed with a laterally extending shifting arm 9 disposed rearwardly of the upper pivot lug 5.

A connecting rod 10 is pivotally connected at one end to the shifting arm 9, as indicated at 11, while the other end thereof is pivotally connected, as at 12, to the lower end of the depending lug 13, of the operating rod 14. The forward end of the latter extends through and is rotatably supported in one of the openings in the radiator 2, and the rear end of the operating rod 14 extends through and is pivotally mounted in the dash board 15 of the motor vehicle. An operating wheel 21 is fixed to the rear end of the rod 10.

A collar 16 is adjustably mounted on the operating rod 14, adjacent to the rear end thereof, and a spiral spring 17 is carried on the rod 14 and is disposed intermediate of the collar 16 and the dash board 15. Another spiral spring 18 has one end connected, as at 19, to the collar 16 and the other end thereof, as at 20, to the dash board 15.

The spring 17 is maintained in the tensioned position by the action of the spring 18 and both these springs in conjunction provide a resilient attachment for the operating rod 14 to prevent its movement unless manipulated for operating the signal member 4. The spring 18 further limits the rotation of the operating arm 10 in either direction and will automatically return the latter and the associated signal member 4 to the normal or inoperative position when the operating wheel 21 is released by the operator after the signaling operation. When in the inoperative position the signal member 4 extends longitudinally relative to the motor vehicle.

While the signal member 4 is illustrated to represent a hand, and is located on the fender of a motor vehicle, it will be obvious that the contour of such signal member may be varied if desired and be attached to the motor vehicle at a point other than the fender.

The signal member 4 is preferably painted in conspicuous colors so as to make the same readily discernible to the operators of following or approaching vehicles.

By the manipulation of the operating wheel 21 the signal member 4 may be shifted in either direction to extend at right angles with respect to motor vehicles and indicate the direction of travel intended by the operator.

What I claim is:

In combination, a signaling apparatus for motor vehicles comprising a signal member provided with a pair of apertured laterally disposed lugs; a vertically disposed supporting pin fixed to the fender of the vehicle and pivotally engaging said apertured lugs; a spring mounted on said pin and disposed intermediate of the said fender and the said signal member for tensionally cushioning the latter on said pin; said signal member provided with a laterally extending shifting arm disposed rearwardly of said lug, an operating rod having its forward end extending through and rotatably supported in the radiator of the vehicle engine, and the rear end thereof rotatably mounted in the dash board of the vehicle; the forward end of said operating rod formed with a right angularly disposed depending lug; a connecting rod having one end pivotally connected to the said shifting arm and the other end thereof being pivotally connected with the said depending lug of the said operating rod; a collar adjustably mounted on said operating rod adjacent to the rear end thereof; a spring mounted on said operating rod intermediate of said collar and the vehicle dash board; and a spring connected with said collar and with said vehicle dash board for limiting the shiftable movement of said operating rod, for returning the latter to the normal inoperative position, and in conjunction with the associated spring mounted on said operating rod, providing a resilient attachment for the latter on the vehicle dash board, substantially as described and for the purpose set forth.

In testimony whereof I affix my signature.

DAVID BAUGHMAN.